(No Model.)

S. W. HALL.
EARTH SCRAPER.

No. 424,058. Patented Mar. 25, 1890.

Witnesses
H. C. Newman,
E. S. Newman.

Inventor
Sylvester W. Hall,
By his Attorneys
Baldwin, Davidson & Wight

UNITED STATES PATENT OFFICE.

SYLVESTER W. HALL, OF ELMIRA, NEW YORK.

EARTH-SCRAPER.

SPECIFICATION forming part of Letters Patent No. 424,058, dated March 25, 1890.

Application filed May 25, 1889. Serial No. 312,018. (No model.)

*To all whom it may concern:*

Be it known that I, SYLVESTER W. HALL, a citizen of the United States, residing at Elmira, in the county of Chemung and State of New York, have invented certain new and useful Improvements in Earth-Scrapers, of which the following is a specification.

My invention relates to an improvement in earth-scrapers; and it consists in providing a stop or gage at the front end of the scraper or scoop to resist the dipping or lead of the scraper when it enters the ground and tends to force its way in too far, thus confining the scraper to a uniform depth of cut. By this means the burden of the team and the holder or driver is very much relieved, and the scraper is prevented from being overturned by overloading, and the team is kept from being balked. The form of this stop or gage and its manner of application must of necessity vary with the kind of scraper to which it is to be applied. It is applied to the ordinary drag-scraper as follows: A gage piece or stop is firmly attached or formed on the scraper at each side and at the front end. The gage or stop is preferably formed of steel, and extends as far forward beyond the front edge of the scraper and at such distance above its cutting-plane as will afford the necessary bearing to hold the scraper to the desired depth of cut. Ordinarily I find two inches a good depth of cut and four inches a good projection for the gage-piece; but the gage-pieces may be made adjustable vertically to vary the depth of cut.

Other ways of applying my invention will be hereinafter set forth.

Figure 1:
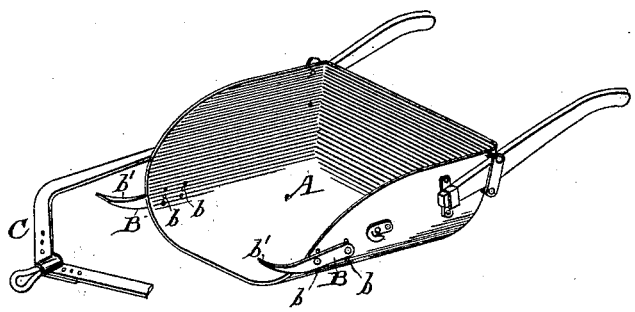
Figure 2:
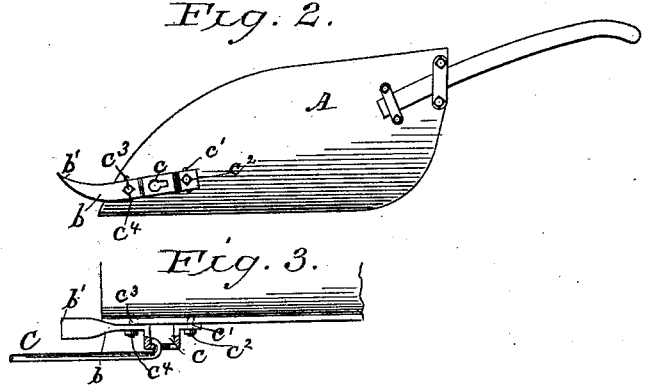
Figure 3:

In the accompanying drawings, Figure 1 is a perspective view of a drag-scraper in loading position with one form of my improvements applied. Fig. 2 is a side elevation of a drag-scraper, showing a modified form of gage-piece. Fig. 3 is a detail view of the same, partly in plan and partly in section.

The drag-scraper A (shown in Fig. 1) is of usual well-known construction, and needs no description. The stops or gage-pieces B are secured to the front end of the scraper, preferably to the sides thereof, by means of bolts $b$. These stops or gages are shown as formed of short rods or bars extending horizontally when the scraper is in loading position and curved upward at their outer ends $b'$ and flattened horizontally to a chisel-point, for the purpose of securing a good bearing-surface, and also to furnish a sharpened point to catch into the ground in dumping, enabling the team to overturn the load on the points and level down the earth by the passage of the inverted scraper over it. A series of holes for the bolts $b$ is shown, so that the gage-pieces may be adjusted.

To that class of drag-scrapers in which the bail is attached by an eye-piece or socket my improvement is very conveniently applied by forming the gage on the front end of the socket, as shown in Fig. 2. As here shown, a socket $c$ for the inner end of the bail on each side of the scraper is provided by forming a U bend in a metallic bar, which is secured to the side of the scraper at $c'$ by a bolt $c^2$ and at $c^3$ by a pivot-bolt $c^4$. By forming a series of holes, as shown, the bar may be adjusted vertically. The front end of the bar is carried forward to form the stop or gage-piece $b$, which is preferably curved upwardly and flattened in the same manner as indicated in Fig. 1.

In that class of scrapers distinguishable from drag-scrapers by being pushed from the rear by attachment to mounted frames, instead of being dragged from the front like the drag-scraper, my improvement is applied with equal advantage and facility; but its line and bearing surface should be increased with the duty required. In this class of scrapers, (usually applied to road-machines and graders,) so well known in this respect as to need no particular description, the scraper-blade is in curved form, and is operated in the process of excavating with one end foremost—that is, diagonally with the direction of the team. The front point of the blade is depressed by mechanical means attached to the mounted frames to the requisite depth of cut, and does the chief part of the cutting.

It is found that in practical operation, owing to the unevenness of the ground supporting the wheels and the distance of the cutting-point of the scraper from any positive support, the point of the scraper-blade is liable to drop or take a lead into the ground, overloading or stopping the team. To remedy this, as in the drag-scraper, my stop or gage is bolted fast or adjustably to the scraper-blade as near its cutting-point as practicable, having its base or bearing surface at such height as to give the least depth of cut required. If a deeper cut is desired, the top of the scraper-blade is rolled forward, (by the usual means employed in this class of machines for that purpose,) by which the cutting-edge is depressed and the gage elevated, permitting a deeper cut.

I have shown and described my improvements as applied to scrapers in several different ways, but all embodying the essential features of my invention.

Other modifications might be illustrated, and will readily occur to those skilled in the manufacture and use of this class of implements.

Having thus described my invention, I declare that what I claim is—

1. The combination, substantially as hereinbefore set forth, of the scraper and the stop or gage-piece extending forwardly therefrom and terminating at a suitable distance in front of the cutting-edge of the scraper to catch into the earth to aid in dumping, the rear end of the stop or gage-piece being adjustably secured to the side of the scraper.

2. The combination, substantially as hereinbefore set forth, of the scraper and the stop or gage-piece secured at its rear end to the side of the scraper, and projecting forwardly beyond and above its cutting-edge, and having an enlarged sharpened outer end, for the purpose specified.

3. The combination, substantially as hereinbefore set forth, of the scraper and the stop or gage-piece extending forwardly therefrom and terminating at a suitable distance in front of the cutting-edge of the scraper, so that the outer end of the stop or gage-piece is adapted to catch into the earth to aid in dumping, the rear end of the stop or gage-piece being secured to the side of the scraper.

4. The combination, substantially as hereinbefore set forth, of the scraper and stops or gage-pieces secured thereto and provided with socket-hooks or eyes for the attachment of draft devices in rear of the cutting-edge of the scraper.

In testimony whereof I have hereunto subscribed my name.

SYLVESTER W. HALL.

Witnesses:
W. I. BALDWIN,
J. E. VARNUM.